United States Patent Office 3,362,819
Patented Jan. 9, 1968

3,362,819
COLOR DIFFUSION TRANSFER PHOTOGRAPHIC PRODUCTS AND PROCESSES UTILIZING AN IMAGE RECEIVING ELEMENT CONTAINING A POLYMERIC ACID LAYER
Edwin H. Land, Cambridge, Mass., assignor to Polaroid Corporation, Cambridge, Mass., a corporation of Delaware
No Drawing. Filed Nov. 1, 1962, Ser. No. 234,864
29 Claims. (Cl. 96—3)

This invention relates to photography and, more particularly, to photographic products and processes for forming photographic images in dyes by diffusion transfer processes.

U.S. Patent No. 2,983,606, issued May 9, 1961, to Howard G. Rogers, discloses processes employing dye developers to form color transfer images and products useful therein. The copending application of Edwin H. Land and Howard G. Rogers, Ser. No. 565,135, filed Feb. 13, 1956, discloses the use of such dye developers in integral multilayer negatives to give multicolor transfer images. This invention is particularly concerned with an improvement in such diffusion transfer processes and, in particular, with the provision of novel diffusion transfer processes and products useful therein whereby images in dye developers are obtained which exhibit unobvious and unexpected photographic qualities.

It is a further object of this invention to provide novel image-receiving elements for use in diffusion transfer processes employing dye developers whereby the resulting color image exhibits superior and unobvious optical and physical properties.

A further object of this invention is to provide diffusion transfer processes and products for performing such processes wherein the color transfer image is only slightly alkaline when it is separated from the exposed and developed photosensitive layers.

Yet another object of this invention is to provide novel image-receiving elements adapted to effect a substantial reduction in the alkalinity of the color transfer image without interfering in the formation of said color transfer image.

Another object of this invention is to provide novel image-receiving elements wherein removal of ions from the image layer during imbibition causes the image dyes to aggregate in the image layer, thereby increasing the stability of the image to light, heat and humidity.

A further object of this invention is to provide novel processes and products wherein oxidation of the dye developers forming the transfer dye images is prevented.

Yet another object of this invention is to provide novel techniques for reducing the pH of a color transfer image prior to exposing the image dyes to air.

A further object of this invention is to provide novel image-receiving elements containing a nondiffusible acid-reacting reagent in a layer adjacent the image-receiving layer.

A further object of this invention is to provide a novel image-receiving element containing a layer of a polymeric acid separated from the image-receiving layer by an inert layer effective to time the action of the polymeric acid.

Another object of this invention is to provide novel photographic diffusion transfer processes which employ image-receiving elements containing a layer of a polymeric acid.

Still another object of this invention is to provide superior diffusion transfer dye images, which dye images do not require post-treatment to reduce the pH thereof.

A further object of this invention is to provide novel color diffusion transfer processes and products wherein processing reagents which are harmful, or potentially harmful, to the image dyes, are removed from effective proximity to such dyes by diffusion to an adjacent layer containing a nondiffusible acid-reacting reagent.

Another object of this invention is to provide novel image-receiving elements for use in diffusion transfer processes, said elements including a layer containing a mordant for a diffusible dye and, in a layer adjacent to said mordant, a mordant for alkali.

Another object of this invention is to provide novel techniques for removing salts from the image layer, thereby increasing the optical clarity and luminosity of the image layer.

Other objects of the invention will in part be obvious and will in part appear hereinafter.

The invention accordingly comprises the processes involving the several steps and the relation and order of one or more of such steps with respect to each of the others, and the products possessing the features, properties and the relation of elements which are exemplified in the following detailed disclosure, and the scope of the application of which will be indicated in the claims.

For a fuller understanding of the nature and objects of the invention, reference should be had to the following detailed description.

The above-mentioned U.S. Patent No. 2,983,606 discloses and claims a highly useful method of forming color images by diffusion transfer wherein the color-providing substances are dye developers. As set forth therein, a dye developer is a compound which is both a dye and a silver halide developing agent. Particularly useful and preferred dye developers are azo and anthraquinone dyes which contain one or more hydroquinonyl groups. It has been proposed that the silver halide developing group be linked to the chromophoric system of the dye developer through a suitable group of atoms which are effective to interrupt any system of conjugation and resonance between the silver halide developing group, e.g., a hydroquinonyl radical, and the chromophoric system or dye portion of the molecule. Such insulating linkages have been found to be quite effective in avoiding or essentially eliminating any significant change in the color characteristics of the dye developer should the hydroquinonyl group be oxidized to the quinone, e.g., by aerial oxidation of the dye developers in the separated image-receiving layer.

It now has been found that although such oxidation may not change the characteristic color of the dye developer, such oxidation may have a material and substantial effect upon the stability to light of the resulting eye developer image. It has further been found that if, prior to exposing the surface of the image-receiving layer to air, the alkalinity of pH of the dye developer environment in the image-receiving layer is adjusted to a level at least substantially precluding alkaline oxidation of the developing radical, a tremendous and remarkable improvement in the stability to light of such dye developers is obtained. It has further been found that images of unusual brilliance and luminosity are obtained if the reduction in alkalinity is effected by diffusing the alkaline ions to an adjacent layer where they are captured and retained in place. It is with respect to these discoveries that this invention is concerned and particularly with the provision of products and processes for accomplishing these unobvious results.

As is well known in diffusion transfer processes of the type contemplated herein and set forth in detail in the aforementioned U.S. patents, a processing composition is applied to an exposed photosensitive emulsion to effect development thereof and an imagewise distribution of diffusible, unoxidized dye developers is formed as a function of development. At least a portion of such diffusible dye developers is transferred imagewise to an image-receiving layer positioned in superposed relationship with said photosensitive emulsion. At the end of the appropriate imbibition period, the image-receiving layer is separated from its superposed relationship with the developed photosensitive emulsion.

The processing compositions employed in diffusion transfer processes of the type contemplated herein usually are highly alkaline, having a pH in excess of 12, and frequently have a pH of the order of 14 or even greater hydroxyl ion concentration.

The photographic transfer dye image frequently retains substantial amounts of photographic reagents, particularly alkali, with which it has been processed, even though the layer of processing composition is caused to adhere to and remain with the photosensitive layer. The presence of these residual reagents may adversely affect the quality and stability of the image, particularly in the presence of significant quantities of alkali. For example, if the receiving layer is highly alkaline, oxidation by atmospheric oxygen of unreacted developing agent or other components of the processing composition is quite likely to occur, and such reactions or subsequent reactions may impart a stain or otherwise discolor the transfer image, particularly the highlights thereof.

It has been proposed to treat the surface of the separated image-receiving layer with a solution which is effective to remove (as by a washing action), neutralize or otherwise render such residual processing reagents relatively innocuous. It has been found, however, where the transfer image is formed by the dye developer transfer process of the aforementioned Rogers Patent No. 2,983,606 and particularly where development is effected in the presence of a quaternary ammonium compound which is capable of forming an active methylene base in alkali, that the color of some dye developer images nevertheless may change or otherwise become degraded. Although the exact mechanism of this color change is not known, it is believed to be due, at least in part, to a coupling reaction between the active methylene quaternary ammonium compound and an oxidation product of the dye developer or of an auxiliary or accelerating developing agent. This type of color change appears to be due to the formation of a new chromophore which, when superposed on the original chromophore, frequently results in dulling or "greying" of the image, and is particularly noticeable in reproduction of sky and clouds. Such a color-forming reaction has been observed particularly where the dye developer or the auxiliary developing agent contains a hydroquinonyl group, in which event the oxidation product involved may be the quinone or semiquinone. [In test tube experiments, a strong green color appears when N-phenethyl-α-picolinium bromide or N-benzyl-α-picolinium bromide is added to an alkaline solution of toluhydroquinone in the presence of air. This initial green color degrades to a yellow-brown with time.] In addition to such undesirable color changes, it also has been found that the oxidation of the transferred dye developers may be an initial step in fading when the images are exposed to light.

Application of an acidic print-coating composition, e.g., a solution containing boric acid (as disclosed and claimed in the copending application of Howard G. Rogers, Ser. No. 93,309, filed Mar. 6, 1961) now U.S. Patent No. 3,239,338 issued Mar. 8, 1966, to the positive image is, of course, effective to reduce the pH thereof. In some instances, and particularly where such a print-coating composition is applied very shortly after separating the positive from the negative, at least part of the color degradation may even be reversed, i.e., it appears that at least some reactions responsible for such color degradation may go through an intermediate stage (or product) which is reversible by the print-coating operation. While such prompt print-coating frequently is effective to prevent a significant amount of permanent color degradation, it is not feasible in practice to print-coat quickly enough to prevent an adverse effect on light stability due to oxidation.

It now has been discovered that if, prior to exposure to atmospheric oxygen, the pH of the image layer is reduced to a level at which aerial oxidation of the developer radical of the dye developers or of auxiliary developing agents, e.g., hydroquinonyl radicals, does not occur, the undesired color degradation does not occur. In addition, the light stability of the dye images is substantially increased.

A relatively simple method of accomplishing the desired pH reduction prior to exposing the dye developer image to air is to provide an acidic solution positioned in the nip formed by the image-receiving element and the photosensitive element as said elements are being separated or peeled apart from their superposed relationship. A bead of said acidic solution is maintained in the nip until the positive image has been completely separated. Use of an aqueous solution containing, e.g., about 2 to 4% boric acid by weight, has been found quite effective to eliminating color degradation. An extremely small quantity of such a boric acid solution, e.g., about 0.5 cc., has been found to be adequate to treat a positive image area of approximately 3¼" x 4¼".

As will be readily recognized, the use of such a liquid treatment is quite practical in continuous processing, e.g., photofinishing, operations, but is somewhat awkward to employ with a hand held self-developing camera, such as those sold by Polaroid Corporation, Cambridge Mass., under the name "Polaroid Land Cameras."

It has further been discovered that the desired pH reduction may be effected in dye developer diffusion transfer processes by providing an acid-reacting layer adjacent the image layer, whereby the alkali ions are caused to diffuse to said acid-reacting layer and are there trapped or precipitated. The acid-reacting layer contains nondiffusible acid groups, e.g., acid radicals attached to a polymer so as to be non-diffusible. This method of pH reduction in effect "washes" the image layer by internally diffusing the alkali ions and salt-forming reagents out of the image layer and into the adjacent acid-reacting layer where they are precipitated. The acid-reacting layer thus may be considered to be a mordant for alkali.

It has quite unexpectedly been found that this use of a polymeric acid to effect internal washing and pH reduction of the image layer results in dye images which are unusually brilliant and luminous in addition to exhibiting increased color purity and light stability.

In accordance with this preferred embodiment of the invention, a layer containing an acid-reacting polymer, and particularly a polymer containing free carboxyl

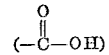

groups, is provided between the image receiving layer (i.e., the layer in which the dye image is formed, and frequently referred to simply as the image layer) and the support. For simplicity, this layer is sometimes referred to herein as the "polymeric acid layer" or as "acid polymer layer."

The acid polymer layer contains at least sufficient acid groups to effect a reduction in the pH of the image layer from a pH of about 13 to 14 to a pH of at least 11 or lower at the end of the imbibition period, and preferably to a pH of about 5 to 8 within a short time after imbibition. As previously noted, the pH of the processing composition preferably is of the order of at least 13 to 14.

It is, of course, necessary that the action of the polymeric acid be so controlled as not to interfere with either development of the negative or image transfer of unoxidized dye developers. For this reason, the pH of the image layer should be kept at a level of pH 12 to 14 until the positive dye image has been formed after which the pH should be reduced very rapidly to at least about pH 11, and preferably about pH 9 to 10, before the positive image is separated and exposed to air. Unoxidized dye developers containing hydroquinonyl developing radicals diffuse from the negative to the positive as the sodium or other alkali salt. The diffusion rate of such dye developers thus is at least partly a function of the alkali concentration, and it is necessary that the pH of the image layer remain on the order of 12 to 14 until transfer of the necessary quantity of dye developer has been accomplished. The subsequent pH reduction, in addition to its desirable effect upon image light stability, serves a highly valuable photographic function by substantially terminating further dye transfer. This processing technique thus effectively minimizes changes in color balance as a result of longer imbibition times in multi-color processes using multilayer negatives.

In order to prevent premature pH reduction evidenced, for example, by an undesired reduction in positive image density, the acid groups are so distributed in the acid polymer layer that the rate of their availability of the alkali controllable, e.g., as a function of the rate of swelling of the polymer layer which rate in turn has a direct relationship to the diffusion rate of the alkali ions. The desired distribution of the acid groups in the acid polymer layer may be effected by mixing the acid polymer with a polymer free of acid groups, or lower in concentration of acid groups, and compatible therewith, or by using only the acid polymer but selecting one having a relatively lower proportion of acid groups. These embodiments may be illustrated, respectively, by (a) a mixture of cellulose acetate and cellulose acetate hydrogen phthalate and (b) a cellulose acetate hydrogen phthalate polymer having a much lower precentage of phthalyl groups than the first-mentioned cellulose acetate hydrogen phthalate.

The layer containing the polymeric acid thus may also contain a water insoluble polymer, preferably a cellulose ester, which acts to control or modulate the rate at which the alkali salt of the polymer acid is formed. As examples of cellulose esters contemplated for use in this invention, mention may be made of cellulose acetate, cellulose acetate butyrate, etc. Such a polymer also may be added to provide increased wet adhesion to prevent separation of the image-receiving layer or other layers of the image-receiving element during processing. The particular polymers and combinations of polymers employed in any given embodiment are, of course, selected so as to have adequate wet and dry strength. Where necessary or desirable, suitable, subcoats may be employed to help the various polymeric layers adhere to each other during storage and use.

As used herein, the term "polymeric acid" is intended to mean polymers which contain acid groups, such as carboxylic acid and sulfonic acid groups, which are capable of forming salts with alkali metals, such as sodium, potassium, etc., or with organic bases, particularly quaternary ammonium bases, such as tetramethyl ammonium hydroxide, or potentially acid-yielding groups, such as anhydrides or lactones, or other groups which are capable of reacting with bases to capture and retain them. The acid-reacting group is, of course, nondiffusible from the acid polymer layer. In the preferred embodiments, the acid polymer contains free carboxyl groups and the processing composition contains a large concentration of sodium ions. The acid polymers found to be most useful are characterized by containing free carboxyl groups, being insoluble in water in the free acid form, and by forming water-soluble sodium salts. One may employ polymers containing carboxylic acid anhydride groups, at least some of which preferably have been converted to free carboxyl groups prior to imbibition. While the most readily available polymeric acids are derivatives of cellulose or of vinyl polymers, polymeric acids from other classes of polymers may be used. As examples of specific polymeric acids contemplated as being used in this invention, mention may be made of dibasic acid half-ester derivatives of cellulose which derivatives contain free carboxyl groups, e.g., cellulose acetate hydrogen phthalate, cellulose acetate hydrogen glutarate, cellulose acetate hydrogen succinate, ethyl cellulose hydrogen succinate, ethyl cellulose acetate hydrogen succinate, cellulose acetate hydrogen succinate hydrogen phthalate; ether and ester derivatives of cellulose modified with sulfoanhydrides, e.g., with ortho-sulfobenzoic anhydride; polystyrene sulfonic acid; carboxymethyl cellulose; polyvinyl hydrogen phthalate; polyvinyl acetate hydrogen phthalate; polyacrylic acid; acetals of polyvinyl alcohol with carboxy or sulfo substituted aldehydes, e.g., o-, m-, or p-benzaldehyde sulfonic acid or carboxylic acid; partial esters of ethylene/maleic anhydride copolymers; partial esters of methylvinyl ether/maleic anhydride copolymers; etc.

It has further been discovered that the provision of an inert interlayer between the image layer and the polymeric acid layer substantially improves the control of the pH reduction by the polymeric acid layer. While this spacer layer preferably is composed of a polymer such as polyvinyl alcohol or a partial acetal of polyvinyl alcohol, such as a partial polyvinyl butyral, other polymers, such as gelatin, which are inert to alkali but through which the alkali may diffuse to the polymeric acid layer may be used. (The use of partial acetals of polyvinyl alcohol to provide such a spacer layer is disclosed and claimed in the copending application of Leonard C. Farney, Howard G. Rogers and Richard W. Young, Ser. No. 447,100, filed April 9, 1965, as a continuation-in-part of Ser. No. 277,099, filed May 1, 1963 (now abandoned).) The presence of such an interlayer has been found quite effective in evening out the various reaction rates over a wide range of temperatures, e.g., by preventing premature pH reduction when imbibition is effected at temperatures above room temperature, e.g., at 95–100° F. By providing an inert interlayer, the rate at which alkali is available for capture in the polymeric acid layer becomes a function of alkali diffusion rates. The pH reduction thus is relatively independent of chemical reaction rates which would show a greater variation over similar wide changes in imbibition temperature.

In the examples set forth below, reference to a multi-color negative is to a multilayer negative in which the blue-sensitive, green-sensitive, and red-sensitive silver iodobromide emulsion layers have positioned behind them, respectively, a yellow dye developer, a magenta dye developer, and a cyan dye developer. A gelatin interlayer is positioned between the yellow dye developer layer and the green-sensitive emulsion, and between the magenta dye developer and the red-sensitive emulsion. Multilayer negatives of this type are disclosed, for example, in FIG. 9 of the previously mentioned U.S. Patent No. 2,983,606. The dye developer layers are prepared by dissolving each dye developer in a water-immiscible solvent and dispersing the resulting solution in gelatin. The particular dye developers employed, unless otherwise indicated, were:

cyan:

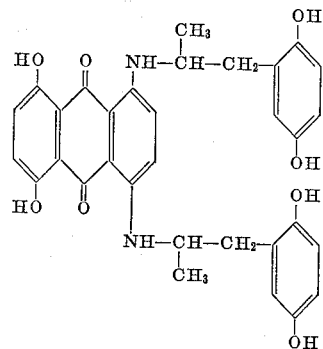

1,4-bis-[α-methyl-β-hydroquinonyl-ethylamino]-5,8-dihydroxy-anthraquinone magenta:

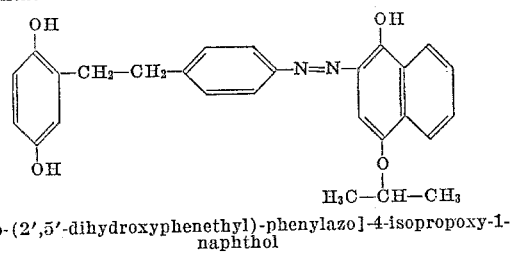

2-[p-(2',5'-dihydroxyphenethyl)-phenylazo]-4-isopropoxy-1-naphthol yellow:

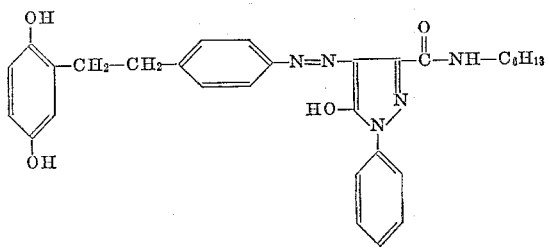

1-phenyl-3-N-n-hexylcarbamyl-4-[p-(2',5'-dihydroxyphenethyl)-phenylazo]-5-pyrazolone The following examples are given for purposes of illustration and are not intended to be limiting:

*Example 1*

An image-receiving element was prepared by coating a 2:1 mixture, by weight, of polyvinyl alcohol and poly-4-vinylpyridine on a cellulose acetate-subcoated baryta paper, at a coverage of approximately 600 mg./ft.$^2$, to provide an image-receiving layer approximately 0.40 mil thick. A multilayer, multicolor negative as described above was exposed and a thin layer of processing composition comprising:

Water _____ cc__ 100
NaOH _____ g__ 5.17
Hydroxyethyl cellulose (high viscosity) [commercially available from Hercules Powder Co., Wilmington 99, Delaware, under the trade name Natrasol 250] _____ g__ 4.03
Sodium thiosulfate _____ g__ 1.15
Benzotriazole _____ g__ 2.3
N-benzyl-α-picolinium bromide _____ g__ 2.3 was spread between said image-receiving element and said exposed multicolor negative as they were brought into superposed relationship in a Polaroid Land Camera. After an imbibition period of 1½ minutes, the picture door of the camera was opened, the tab of the picture portion of the image-receiving element partially separated, and a few drops of a 3% boric acid solution containing 6% arbutin were placed at the nip of the superposed sheets while the camera was held vertically. Separation of the transfer image from the negative was completed by slowly peeling the sheets apart while maintaining a bead of the boric acid solution in the nip formed by said sheets. The resulting transfer image showed no evidence of greying, whereas a control multicolor image prepared in the same manner but exposed to air before print-coating did exhibit greying. Examination of the individual cyan, magenta and yellow spectral reflection curves did not show any major changes, but the neutral spectral reflection curve of the control multicolor image showed a substantial increase in absorption with the range of 380 to about 575 mµ. This greying was particularly noticeable in sky and other areas having substantial cyan. Accelerated fading tests (1 standard week of exposure to sunlight in Florida) of similarly prepared multicolor step wedge images showed that the magenta component of the image treated in accordance with this invention faded 12% whereas the magenta in the control faded 20%. In addition, there was markedly less "browning" of the yellow as compared with the control.

*Example 2*

A receiving layer was prepared by coating a solution of 5 g. cellulose acetate and 5 g. cellulose acetate hydrogen phthalate (commercially available from Eastman Kodak Co., Rochester, N.Y., and having approximately 35% phthalyl and 18% acetyl content) dissolved in 100 g. of acetone on subcoated baryta paper to a thickness of approximately 1 mil. An image-receiving layer approximately 0.25–0.35 mil thick and comprising a 2:1 mixture, by weight, of polyvinyl alcohol and poly-4-vinylpyridine was then applied. When this image-receiving element was imbibed for 2½ minutes according to the procedure described in Example 1, the image-receiving layer was found to have a pH of 8 when separated from the multicolor negative. The multicolor transfer image showed no evidence of cyan greying, and the image was notably luminous.

*Example 3*

An image-receiving element was prepared in accordance with the procedure described in Example 2, employing cellulose nitrate subcoated baryta paper and a 2:1 mixture, by weight, of cellulose acetate (CA) and cellulose acetate hydrogen phthalate (CAHP). The CA/CAHP solution was applied in three coats to give a total thickness of approximately 1.30 mils. The 2:1 polyvinyl alcohol/poly-4-vinylpyridine image-receiving layer was approximately 0.40 mil thick. After imbibition as in Example 2, the positive image exhibited a pH of 8. The positive also exhibited high luminosity, lack of greying and good flexibility.

Other image-receiving elements prepared in a manner similar to Examples 2 and 3 but having cellulose acetate/cellulose acetate hydrogen phthalate ratios, by weight, ranging from about 3 to 1 to about 1 to 3 exhibit similar reduced pH upon separation. Similarly, cellulose acetate butyrate has been employed in place of cellulose acetate with similar success.

*Example 4*

Cellulose acetate hydrogen succinate was prepared by dissolving 246 g. (1 mole) of cellulose acetate (Type E-383-40, Eastman Kodak Co.; 38% acetyl) in about 2 liters of acetone and 158 g. of pyridine (2 moles). 150 g. (1.5 mole) of succinic anhydride was added and the solution was refluxed over the weekend. The product was isolated by precipitation into dilute hydrochloric acid and the precipitate washed with water. The resulting cellulose acetate hydrogen succinate was used, without addition of cellulose acetate, to prepare an image-receiving element similar to that described in Example 2.

*Example 5*

An image-receiving element was prepared in a manner similar to that set forth in Example 2 by first applying a coating solution containing cellulose acetate butyrate and cellulose acetate hydrogen phthalate in a 1:2 ratio by weight. A second layer of cellulose acetate butyrate and cellulose acetate hydrogen phthalate then was applied using a solution of a 2:1 mixture by weight.

*Example 6*

An image-receiving element was prepared as in Example 5 by first applying a 7% solids solution containing a 1:1 mixture by weight of cellulose acetate and cellulose acetate hydrogen phthalate, followed by a 4% solids solution containing a 3:1 mixture by weight of cellulose aectate and cellulose acetate hydrogen phthalate.

*Example 7*

An image-receiving element was prepared as in Example 2, except that the polymeric acid layer was prepared by coating a 1:3 mixture by weight of cellulose nitrate and the butyl half ester of medium viscosity poly-(methyl vinyl ether/maleic anhydride):

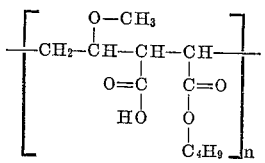

[The polymeric anhydride is commercially available from General Aniline & Film Corporation, New York, N.Y., under the trade name Gantrez AN–139.]

Example 8

30 g. of high viscosity poly-(ethylene/maleic anhydride) [commercially available from Monsanto Chemical Co., St. Louis, Mo., under the trade name DX–840–31 Resin] in 30 cc. of n-butanol and 150 cc. of ethylacetate was refluxed about 1 hour. Heat was discontinued and the mixture was allowed to stand overnight before being refluxed for an additional 2 hours. The solution was then slightly yellowish, slightly milky in appearance and contained approximately 20% solids. Two parts of the above solution were diluted with 1 part, by volume, of acetone and coated on cellulose nitrate subcoated baryta paper at 10'/minute. A solution containing 2% cellulose acetate was then applied at a coating speed of 5'/minute. A very thin coating was then applied at 2'/minute of a mixture of alcohol soluble cellulose nitrate with water and alcohol soluble partially hydrolyzed polyvinyl acetate. An image layer of polyvinyl alcohol and poly-4-vinylpyridine was applied as in Example 1. Use of this image-receiving element as in Example 1 gave a multicolor positive image of excellent color quality with no greying.

Example 9

An image-receiving element was prepared as in Example 8 except that the layer of cellulose acetate was omitted.

Example 10

300 g. of DX–840–31 Resin was dissolved in 1500 cc. of acetone. 150 g. of n-butyl alcohol and 1 cc. of 85% phosphoric acid were added and the mixture was refluxed for 14 hours. The resulting solution of

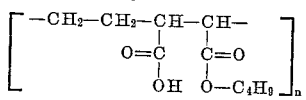

was allowed to cool and then coated on a cellulose nitrate subcoated baryta paper to give a layer about 0.8 mil thick. An image-receiving layer about 0.3 mil thick of polyvinyl alcohol and poly-4-vinylpyridine (2:1 by weight) was then applied. This image-receiving element gave excellent results when processed as in Example 1.

Example 11

The procedure described in Example 10 was repeated, except that a layer of polyvinyl alcohol approximately 0.5 mil thick was coated between the layer of the partial butyl ester of the ethylene/maleic anhydride copolymer and the image-receiving layer. The polyvinyl alcohol was applied using a solution of 7 parts by weight polyvinyl alcohol, 100 parts by weight of water, and a small amount of wetting agent. Use of this image-receiving element in a diffusion transfer process as in Example 1 gave a multicolor positive image exhibiting no greying, good light stability and good flexibility. In addition, this image-receiving element exhibited more color balance over a wider range of imbibition temperatures than did the image-receiving element of Example 10.

Example 12

An image-receiving element similar to that in Example 11 was prepared using partial polyvinyl butyral instead of polyvinyl alcohol. Similar photographic results were obtained.

Example 13

Image-receiving elements were prepared in a manner similar to that set forth in Examples 10 and 11 except that the esterification reaction was performed in methyl ethyl ketone and about 60–65% of the maleic anhydride groups were reacted to give the half butyl esters, as compared with about 30–35% substitution in Examples 10 and 11.

Example 14

The procedure described in Example 10 was repeated using the half octyl ester prepared by dissolving 200 g. of the DX–840–31 poly-(ethylene/maleic anhydride) resin in 900 cc. of acetone, adding 176 g. of 2-ethyl hexyl alcohol in 100 cc. of acetone, and then adding 0.66 cc. concentrated hydrochloric acid. The mixture was heated and stirred 15 hours at reflux. The polymer was isolated by precipitation into hexane, washed with benzene and dried.

Example 15

The procedure described in Example 14 was repeated using 188 g. of hexyl alcohol to give the half hexyl ester.

Example 16

Image-receiving elements were prepared as in Examples 10 and 11 employing half butyl esters of the poly-(ethylene/maleic anhydride) prepared by reaction with, respectively, 20%, 40% and 60% of the theoretical amount of n-butanol.

Example 17

The procedure described in Example 2 was repeated, a 1:1 mixture by weight of cellulose acetate and cellulose acetate hydrogen phthalate being applied to give a coverage of approximately 4500–5000 mg./ft.$^2$. The image-receiving layer of 2:1 polyvinyl alcohol and poly-4-vinylpyridine was applied to give a coverage of approximately 600 mg./ft.$^2$. A small amount of 1-phenyl-5-mercaptotetrazole also was present in the image-receiving layer. A layer of processing composition approximately 0.003" thick was spread between the exposed multicolor negative and the image-receiving element as they were brought into superposed relationship. The positive image was separated after an imbibition period of 2' at which time the positive image pH was 11. The following table shows the pH of the positive image as recorded at the stated times after the positive was separated:

| Time: | pH |
|---|---|
| 30" | 11 |
| 1' | 11 |
| 1½' | 9.5 |
| 2' | 9 |
| 3' | 8 |

Example 18

An image-receiving element was prepared in the manner described in Example 17, except that 30% of arbutin (based on solids) was included in the mixture of cellulose acetate and cellulose acetate hydrogen phthalate. The positive image formed by diffusion transfer processing using this image-receiving element showing a further improvement in light stability when subjected to accelerated fading tests. In addition, there was no yellowing of the positive image as has been observed sometimes after accelerated fading tests of positive images after-treated with a solution containing arbutin.

Example 19

When the procedure described in Example 10 was repeated incorporating arbutin in the layer of the half butyl ester of poly(ethylene/maleic anhydride), improved results were obtained similar to those obtained in Example 18.

Example 20

The procedures described in Examples 10 and 11 were repeated, incorporating 10% imidazole

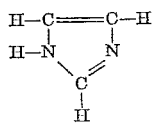

in the solution of the half butyl ester of poly-(ethylene/maleic anhydride) before coating. Similar excellent transfer images were obtained. The presence of the imidazole appeared to increase the rate of pH reduction without decreasing the transfer image density.

Example 21

Results similar to those obtained in Example 20 were obtained when the image-receiving elements prepared in accordance with the procedures described in Examples 10, 11 and 17 were surface treated with a solution containing 10 parts by weight of imidazole to 100 parts by weight of water. This solution appears to soak into the image-receiving layer.

Example 22

The procedure described in Example 11 was repeated, except that 30% of arbutin (based on solids) was included in the solution employed to apply the layer of the partial butyl ester of the ethylene/maleic anhydride copolymer.

Example 23

The procedure described in Example 2 was repeated, incorporating 10% imidazole in the solution of cellulose acetate and cellulose acetate hydrogen phthalate. Similar transfer images were obtained. The presence of the imidazole appeared to increase the rate of pH reduction without decreasing the transfer image density.

Example 24

The procedure described in Example 11 was repeated, except that the image-receiving layer was applied using a solution comprising (a) 20 cc. of aqueous polyvinyl alcohol (10%) solution, (b) 10 cc. of a 50:50 by volume solution of ethanol and water containing 10% of the p-trimethylammonium benzaldehyde p-toluene sulfonate partial acetal of polyvinyl alcohol, (c) 60 cc. of water and (d) 0.25 cc. of 1-phenyl-5-mercaptotetrazole. After a 2′ imbibition, the image layer had a pH of 10. The following table shows the pH of the positive image as recorded at the stated time after the positive was separated:

| Time: | pH |
|---|---|
| 30″ | 8.5 |
| 1′ | 8.5 |
| 1½′ | 8 |
| 2′ | 7 |
| 3′ | 6.5 |

[Use of partial acetals of polyvinyl alcohol with trialkylammonium benzaldehyde quaternary salts as image-receiving layers is disclosed and claimed in the copending application of Howard C. Haas, Ser. No. 71,424, filed Nov. 25, 1960, now U.S. Patent No. 3,239,337 issued Mar. 8, 1966.

Example 25

An all plastic image-receiving element was prepared by casting on glass a solution comprising a 1:1 mixture of cellulose acetate and cellulose acetate hydrogen phthalate (5% of each polymer by weight) dissolved in a mixture of 3 parts ethyl acetate and 1 part methanol by volume, and containing titanium dioxide (20% by weight of the total plastic) to form a film approximately 4.5 mils thick. A thin subcoat of alcohol soluble cellulose nitrate with water and alcohol soluble partially hydrolyzed polyvinyl acetate was then applied, followed by an image layer of 2:1 polyvinyl alcohol and poly-4-vinylpyridine approximately 0.4 mil thick. This image-receiving element was imbibed for 2′ with a layer 0.0038″ thick of processing composition spread between the positive and negative. The pH of the positive immediately after separation was 11. The following table shows the pH of the positive image as recorded at the stated times after the positive was separated:

| Time: | pH |
|---|---|
| 30″ | 10 |
| 1′ | 10 |
| 1½′ | 9.5 |
| 2′ | 9.5 |
| 3′ | 9 |

Example 26

A photosensitive element was prepared by coating a subcoated film base with a solution comprising 0.2 g. of the pH-sensitive dye developer obtained by coupling p-aminophenyl hydroquinone into 5-amino-1-naphthol [as disclosed and claimed in the copending application of Helen P. Husek and Myron S. Simon, Ser. No. 197,283, filed May 24, 1962, now U.S. Patent No. 3,236,645 issued Feb. 22, 1966; note, Example 3 thereof] dissolved in 1 cc. of dimethylformamide and added to 10 cc. of an acetone solution containing 2% cellulose acetate hydrogen phthalate. A silver iodobromide emulsion was applied over the dye developer layer. This negative was exposed and processed with a processing composition similar to that described in Example 1 and to which 0.2% of 4′-methylphenylhydroquinone was added, using an image-receiving element prepared as described in Example 11, and treated by the procedure described in Example 21. After a 2′ imbibition, the positive was separated an had a pH of 7, which pH dropped to 6 after another 30″ and to 5 by 1 minute after stripping. The positive image was greenish-gray when first stripped, and turned to a bluish-black within a minute after stripping. The resulting image faded approximately 30% when exposed to a xenon arc for 40 hours at high humidity. This accelerated fading test showed that the image was much more stable than the image obtained with the same dye developer using an N-methoxymethyl polyhexamethylene adipamide image-receiving layer as used in Example 9 of the aforementioned Ser. No. 197,283, now U.S. Patent No. 3,236,645 issued Feb. 22, 1966. When the procedure described in this example was repeated with a 1′ imbibition time, the pH of the positive was 7 immediately after separation, and dropped to 5 by 3′ after separation.

Example 27

The procedure described in Example 2 was repeated using a cellulose acetate hydrogen phthalate having a phthalyl content of approximately 16% and omitting the cellulose acetate. Similar results were obtained.

The diffusion transfer images obtained in accordance with this invention, employing image-receiving elements containing polymeric acid layers, e.g., as in Example 2 through 27, are characterized by being unusually luminous and retain their luminosity with time. This luminosity is believed to be a direct result of the extraction of the alkali ions from the image layer and trapping them in the underlying polymeric acid layer. In addition to the fact that subsequent print-coating operations, such as previously proposed for improving light stability and image quality, may be completely avoided by use of such image-receiving elements, the images obtained have a luminosity and quality which could not be obtained by such print-coating procedures, even if a polymer were included in the coating solution to increase the image gloss. While salts may sometimes crystallize or precipitate on the surface of positive images treated as in Example 1, such salt precipitation is not found when image-receiving elements containing a polymeric acid layer are used, such salts having been extracted into the polymeric acid layer, where they appear to be substantially permanently retained. This appears to be confirmed by accelerated fading tests, e.g., 100 hours exposure to a xenon arc at high humidity or two standard weeks' exposure to sunlight in Florida, which tests have failed to affect the luminosity of the prints. Removal of the alkali ions from image-receiving layers helps to decrease their permeability to oxygen and to increase the rigidity of the polymer; this is especially true where the image-receiving layer contains polyvinyl alcohol as in the above examples. The image-receiving elements also are characterized by excellent resistance to cracking, notwithstanding possible increased polymer rigidity noted above.

The inert spacer layer, e.g., the polyvinyl alcohol or partial polyvinyl butyral interlayers of the above examples, acts to "time" control the pH reduction by the polymeric acid layer. This timing is a function of the rate at which the alkali diffuses through this inert spacer layer. It has been found that the pH does not drop until the alkali has passed through this spacer layer, i.e., the pH is not reduced to any significant extent by the mere diffusion into the polyvinyl alcohol interlayer, but the pH drops quite rapidly once the alkali diffuses through the polyvinyl alcohol layer.

It is an important feature of the preferred embodiments of this invention that the reaction of the polymeric acid with the diffusing alkali releases water. This water of reaction appears to have an accelerating effect upon the rate at which the pH is reduced. Prior to permeation of the alkali through the inert spacer layer, the equilibria favor the alkali remaining close to the negative and close to the image layer. Once alkali has permeated through to the polymeric acid layer, the equilibria are shifted by the trapping of that alkali. In addition, the water formed by reaction of the acid polymer with the alkali helps to remove alkali ions from the image layer and helps swell the inert polymer, thereby increasing the rate at which the alkali diffuses through the inert layer to the polymeric acid layer. These factors help to keep the pH high until the image is formed, and then to cause the pH to drop rapidly after the image has been formed. Thus, the pH may be kept high during development and transfer, and rapidly dropped after the transfer image has been formed. This also helps to effect the pH reduction within the same imbibition periods, e.g., 90 seconds, which otherwise would be employed. In addition, the released water of reaction permits the positive and negative to remain in superposed relationship for much longer imbibition times without sticking which is caused by drying out. In turn, this released water permits one to continue imbibition for periods long enough to assure more than the minimum desired pH reduction. The fact that the pH reduction also acts to create a self-limiting transfer density permits such continued imbibition to proceed without undesired color balance changes.

The trapping, e.g., precipitation, of alkali in the polymeric acid layer also appears to increase the rate at which the dye developers are transferred to the image-receiving element. It also has been observed that there is substantially less dye present in the residual layer of the processing composition when such image-receiving elements are used than when an image-receiving element, such as that described in Example 1, is used which does not contain the polymeric acid layer. This was particularly noticeable where a portion of the processing layer adhered to the image-receiving layer upon separating the positive at the end of the imbibition period. In some such instances, there was no noticeable amount of dye in the residual adhered processing layer, so that the presence of the residual processing layer was hardly noticeable.

Examination of cross-sections of processed image-receiving elements containing inert spacer layers, e.g., a polyvinyl alcohol interlayer as in Example 11, showed that essentially all of the image dyes were contained in the image-receiving layer, the polyvinyl alcohol layer being clear and essentially free of dye developer.

It also has been found that image-receiving elements containing the polymeric acid layer exhibit greater resistance to scratching and fingerprinting than image-receiving elements containing the same image-receiving layer, e.g., a 2:1 mixture of polyvinyl alcohol and poly-4-vinylpyridine, but without the polymeric acid layer. Removal of the ions from the image layer permits the molecules around the dyes to come closer together for a tougher bond which imbeds the image dyes in a clear, brilliant neutral or near neutral layer that permits unusually luminous colors.

Improvements in interimage effects also have been found to result from the use of image-receiving elements containing the polymeric acid layer. These improvements, while visible to the eye confirmed by analytical sensitometry, and are particularly noticeable in the reproduction of foliage and other green subjects. One improvement appears to be the obtaining of some undercut in the shoulder portion of the magenta positive curve. Improved, i.e., reduced, yellow $D_{min}$ also is observed.

In the preferred embodiments of this invention, the initial pH of about 14 is reduced to about 9 to 11 after about a 1½ minute imbibition, at which time the positive is separated. The pH of the positive continues to drop, e.g., to about 7 to 8 within a minute after stripping the negative and positive apart. In some instances, the pH has dropped to values as low as 6 or even lower within several minutes after imbibition was terminated. It also has been observed that the pH of the developed negative element is lower when the image-receiving element contains an acidic polymer layer than in the absence of such a layer.

Although the preferred image-receiving layer is a mixture of polyvinyl alcohol and poly-4-vinylpyridine (such receiving layers are disclosed and claimed in the copending application of Howard C. Haas, Ser. No. 50,848, filed Aug. 22, 1960, now U.S. Patent No. 3,148,061 issued Sept. 8, 1964), the invention is not limited thereto. Other image-receiving layers are known in the art and may be employed. Similarly, while the preferred embodiment effects development in the presence of a quaternary ammonium compound (as disclosed and claimed in the copending application of Milton Green and Howard G. Rogers, Ser. No. 50,851, filed Aug. 22, 1960, now U.S. Patent No. 3,173,786 issued Mar. 16, 1965), and particularly a quaternary ammonium compound capable of forming an active methylene base in alkali, the invention is not so limited, even though the advantages are most dramatic when such an active methylene quaternary ammonium salt is used.

The symbol pH as used throughout the specification and the attached claims represents the logarithm of the reciprocal of the hydrogen in concentration. The pH was determined by the use of pH paper wet with distilled water and measured at the surface of the image-receiving layer.

When the procedure described in Example 1 was repeated omitting the cellulose acetate, i.e., coating a comparable layer of only cellulose acetate hydrogen phthalate having a phthalyl content of about 35%, pH reduction occurred so rapidly that the positive image density was substantially reduced. When the procedure was repeated without the cellulose acetate hydrogen phthalate, i.e., using a comparable layer of only cellulose acetate, the positive image exhibited good density but did not exhibit the reduced pH, the improved image stability or as good color as the positive image in Example 2.

Suitable solvents for applying the polymeric acid layer include acetone, methyl ethyl ketone, methanol, ethyl acetate, butyl acetate, etc., as well as mixtures thereof.

Another method of reducing the positive image pH prior to exposure to air is to inject an acidic gas, e.g., carbon dioxide, between the superposed positive and negative, whereby the gas "blows apart" the superposed positive and negative. The use of an injected gas, including carbon dioxide, to separate the positive from the negative is disclosed and claimed in the copending application of Richard W. Young, Ser. No. 242,217, filed Dec. 4, 1962, now U.S. Patent 3,295,971.

The use of arbutin in diffusion transfer processes to improve the light stability of dye developer images is disclosed and claimed in the copending application of Samuel Dershowitz, Ser. No. 247,862, filed Dec. 28, 1962, now U.S. Patent No. 3,287,127.

The use of imidazole in diffusion transfer processes employing dye developers is disclosed and claimed in the copending application of Howard G. Rogers et al., Ser. No. 247,868 filed Feb. 18, 1963, now Patent No. 3,287,127.

Example 25 above shows the preparation of an all plastic image-receiving element incorporating this invention. It will be understood that the titanium dioxide or other pigment may be omitted if transparencies are desired instead of a reflection print. Where desired, titanium dioxide may be incorporated in the inert polymeric interlayer, to give increased reflectivity.

Some of the color degradation of the transfer image may be due to transfer to the image-receiving element of auxiliary developing agent oxidized in the negative. The transfer images obtained using the novel image-receiving elements of this invention exihibit little or none of this type of stain. Although the reason for this effect is not fully understood, it is believed that at least part of such stain-forming reagents also may be precipitated in the polymeric acid layer and hence are not visible to the observer.

Where the dye mordant in the image-receiving layer is acid soluble, e.g., poly-4-vinylpyridine, and the image dye is alkali soluble, e.g., a dye developer, the greatest increases in stability to light are found where the dye layer is rendered substantially neutral, and an inert, substantially neutral polymeric layer separates the mordant layer from the polymeric acid layer.

Use of the novel image-receiving elements of this invention makes feasible the use of image dyes which are pH sensitive, and particularly the use of dye developers having less pH insulation since the final pH of the image layer can be more accurately and reproducibly controlled. In addition, this invention facilitates the use of image dyes which are pH sensitive, and which are incorporated in the negative at a pH such that they are light-transmittant, and which shift to a desired light-absorbant state by appropriate pH adjustment.

Processing preferably is effected in the presence of an auxiliary or accelerating silver halide developing agent which is substantially colorless, at least in the unoxidized form. Particularly useful are substituted hydroquinones, such as phenylhydroquinone, 4'-methylphenylhydroquinone, toluhydroquinone, tertiary-butylhydroquinone, and 2,5-triptycene diol. These hydroquinones may be employed as components of the processing composition or they may be incorporated in one or more layers of the negative. Particularly useful results are obtained when 4'-methylphenylhydroquinone is dispersed in one or more of the gelatin interlayers and/or in a gelatin layer coated over the blue-sensitive emulsion layer.

Where desired, the support for the image-receiving layer may be transparent or opaque. Suitable opacifying agents may be incorporated in the negative and/or positive to permit imbibition to be completed outside of a camera, i.e., in an area exposed to light actinic to the silver halide emulsions.

As noted above, the preferred embodiment of this invention contemplates reduction of the positive image pH to a level substantially precluding aerial oxidation of developer moieties. The provision of antioxidants, such as arbutin, prior to exposure of the image to air to provide additional protection against oxidation also is within the scope of this invention. Since the reduction in pH continues for at least a short time after the positive image is separated from the negative, provision of such an antioxidant permits the positive to be separated at a slightly higher pH than would be otherwise desirable.

It is also contemplated to provide other adjuvants, e.g., ultraviolet absorbers, effective to improve the light stability or other properties of the positive image. Thus, an ultraviolet absorber may be included in the processing composition and deposited on the image-receiving layer during imbibition, or it may be present in a thin overcoat on the image-receiving layer prior to imbibition.

It has previously been proposed, in U.S. Patent No. 2,635,048, issued Apr. 14, 1953 to Edwin H. Land, to neutralize at least part of any residual alkali by incorporating an acidic reacting reagent, e.g., a derivative of an organic acid, in a layer behind the image-receiving layer, which derivative is effective to release an organic acid during imbibition and thereby reduce the alkalinity of the image-receiving layer. While this approach is useful in some instances, it requires careful control lest the diffusing acid interferes with the transfer process, e.g., by diffusing into the developing silver halide emulsion stratum and prematurely stopping development. In addition, such a procedure results in the introduction of additional ions into the image layer. Thus, the image layer may be neutralized, but it cannot be considered as having been "washed."

U.S. Patent No. 2,584,030, issued Jan. 29, 1954 to Edwin H. Land, also proposes to effect a neutralization of at least part of the residual alkali by employing a soluble substance of acid reaction. Insofar as this patent contemplates the ues of metal salts, e.g., lead nitrate, the above comments regarding U.S. Patent No. 2,635,048 also are applicable. There is a disclosure, however, in U.S. Patent No. 2,584,030 of the use of a polymeric acid such as cellulose acetate hydrogen phthalate, as a component of image-receiving elements effective to obtain pH reduction in silver transfer processes. The instant invention may be distinguished therefrom, among other ways, by the use of dye developers, the use of dyeable polymers as the image layer, and by the relatively thicker polymeric acid layers as compared with the image layer.

In all embodiments of this invention involving a polymeric acid layer, the polymeric acid layer preferably is thicker than the image-receiving layer and has an appreciably higher mg./ft.$^2$ coverage. The image-receiving layer is preferably about 0.25 to 0.4 mil thick, and the polymeric acid layer is preferably 0.5 to 1.5 mil thick. If an inert spacer layer is present, that layer is preferably about 0.4 to 0.7 mil thick.

Although the invention has been illustrated in connection with dye developers, and the invention is particularly applicable to dye developers because of their susceptibility to aerial oxidation, the novel image-receiving elements of this invention may be used in other diffusion transfer processes to obtain pH reduction and particularly to obtain transfer images exhibiting great optical clarity and luminosity.

Since certain changes may be made in the above products and processes without departing from the scope of the invention herein involved, it is intended that all matter contained in the above description shall be interpreted as illustrative and not in a limiting sense.

What is claimed is:

1. In a process of forming color transfer images wherein a dye image-forming substance is transferred imagewise by means of an alkaline processing composition from a photosensitive silver halide layer to a superposed polymeric image-receiving layer to form a dye image, the improvement of maintaining the pH of said alkaline processing composition at a pH of about 12 to 14 until the development of each said silver halide layer and the formation of said dye image are substantially completed, and thereafter rapidly reducing the pH of said image-receiving layer to a lower pH level substantially precluding aerial oxidation of silver halide developing radicals present in said image-receiving layer, said pH reduction to said lower level being effected, prior to exposing said image to air, by an acidic polymeric layer positioned between said image-receiving layer and a support carrying said image-receiving layer.

2. A process as defined in claim 1, wherein said transferred dye image-forming substance is an unoxidized dye developer.

3. The method of stabilizing a diffusion transfer dye image comprising extracting alkali and other diffusible salt-forming reagents from a polymeric layer containing said dye image, diffusing said salt-forming reagents to a layer containing a polymeric acid and positioned between said image-containing layer and a support therefor, and precipitating said salt-forming reagents in said polymeric acid layer, thereby obtaining a diffusion transfer dye image exhibiting increased luminosity and light stability.

4. The method of stabilizing a positive dye developer image comprising extracting alkali and other diffusible salt-forming reagents from a polymeric layer containing said dye developer image, diffusing said salt-forming reagents to a layer containing a polymeric acid and positioned between said image-containing layer and a support therefor, and precipitating said salt-forming reagents in said polymeric acid layer, thereby obtaining a dye developer image exhibiting increased luminosity and light stability.

5. The method as defined in claim 4, wherein said dye developer image is a multicolor image, said image layer contains a mixture of polyvinyl alcohol and poly-4-vinylpyridine, and said polymeric acid layer contains cellulose acetate and cellulose acetate hydrogen phthalate.

6. The method as defined in claim 4, wherein said polymeric acid is a partial ester of an ethylene/maleic anhydride copolymer.

7. The method as defined in claim 4, wherein said dye developer image is a multicolor image, said image layer contains a mixture of polyvinyl alcohol and poly-4-vinylpyridine, and said polymeric acid is a partial ester of an ethylene/maleic acid anhydride copolymer.

8. The method as defined in claim 4, wherein an alkali-permeable polymeric layer is positioned between said image layer and said layer containing a polymeric acid.

9. The method as defined in claim 8, wherein said alkali-permeable polymeric layer is polyvinyl alcohol.

10. An image-receiving element comprising baryta paper having coated thereon a layer of a partial ester of an ethylene/maleic anhydride copolymer, and an outer layer of a mixture of polyvinyl alcohol and poly-4-vinylpyridine.

11. An image-receiving element as defined in claim 10, including a layer containing polyvinyl alcohol positioned between said first-mentioned and said second-mentioned layers.

12. In a process which comprises developing an exposed photosensitive element containing a layer of a blue-sensitive silver halide emulsion, a layer of a green-sensitive silver halide emulsion, and a layer of red-sensitive silver halide emulsion, said silver halide emulsions being superposed on the same support and having associated therewith, respectively, a yellow dye developer, a magenta dye developer, and a cyan dye developer, each of said dye developers containing a hydroquinonyl radical, said development being effected in the presence of a substantially colorless hydroquinone, a quaternary ammonium compound and an alkali metal hydroxide, and forming a transfer image by diffusion transfer of unoxidized dye developers to a superposed image-receiving layer, the improvement comprising maintaining the pH at about 13 to 14 until said development and said transfer have been substantially completed, and thereafter rapidly reducing the pH of said transfer image to a lower level substantially precluding aerial oxidation of the hydroqinonyl developing moiety of said dye developers upon separating and exposing said transfer image to air, said pH reduction being effected by diffusing alkali and other salt-forming reagents from the layer containing said transfer image to an adjacent layer containing a polymeric acid capable of forming salts with alkali metals, said adjacent layer being positioned on the side of said image-receiving layer most distant from the silver halide emulsions of said photosensitive element.

13. The process as defined in claim 12, wherein said pH reduction continues after said transfer image is exposed to air.

14. The process as defined in claim 12, wherein said quaternary ammonium compound is capable of forming an active methylene base in alkali.

15. The process as defined in claim 12, wherein an inert, alkali-permeable polymeric layer is positioned between said image layer and said polymeric acid layer, said inert alkali-permeable polymeric layer being effective to prevent premature pH reduction.

16. The process as defined in claim 12, wherein said polymeric acid layer is thicker than said image layer.

17. The process as defined in claim 15, wherein said image-receiving layer is about 0.25 to 0.4 mil thick, said inert polymeric layer is about 0.4 to 0.7 mil thick and said polymeric acid layer is about 0.5 to 1.5 mil thick.

18. The process as defined in claim 12, wherein said polymeric acid is cellulose acetate hydrogen phthalate.

19. The process as defined in claim 12, wherein said polymeric acid is cellulose acetate hydrogen succinate.

20. The process as defined in claim 12, wherein said polymeric acid is a partial ester of an ethylene/maleic anhydride copolymer.

21. The process as defined in claim 20, wherein said ester is a butyl ester.

22. The process as defined in claim 15, wherein said inert polymeric layer comprises polyvinyl alcohol.

23. The process as defined in claim 12, wherein said polymeric acid is a partial ester of a methylvinyl ether/maleic anhydride copolymer.

24. The process as defined in claim 12, wherein the reaction of said polymeric acid with said alkali releases water, thereby increasing the rate of subsequent pH reduction.

25. The process as defined in claim 12, wherein said dye developer is pH-sensitive.

26. An image-receiving element for use in diffusion transfer processes comprising a support, an image layer thereon including a mordant for a dye, and a layer thereon containing a mordant for alkali positioned between said image layer and said support, said mordant for alkali being a polymer containing carboxylic acid groups, and a layer of a polymer permeable to said alkali positioned between said image layer and said other layer.

27. An image-receiving element as defined in claim 26, wherein said interlayer of alkali-permeable polymer contains titanium dioxide to give increased reflectivity.

28. The process of forming dye developer color images by diffusion transfer, comprising the steps of applying an alkaline processing composition to an exposed silver halide photosensitive element, said alkaline processing composition having a pH of at least 12, forming an imagewise distribution of diffusible unoxidized dye developer in said photosensitive element as a function of said development, transferring to a superposed image-receiving layer a quantity of said diffusible dye developer sufficient to form a visible color image thereon, reducing the pH of said image-receiving layer after said transfer has been effected from a pH in excess of 12 to a pH of about 11 by diffusion of alkali ions from said image-receiving layer to an inner layer comprising a polymer containing acid groups, said inner layer being positioned between said image-receiving layer and a support therefor and thereafter separating said image-receiving layer from said superposed relationship.

29. The process as defined in claim 28, wherein the pH of said image-receiving layer is further reduced, after said separation, by further diffusion of alkali ions to said inner layer until the said image-receiving layer is substantially neutral.

References Cited

UNITED STATES PATENTS

| 2,584,030 | 1/1952 | Land | 96—76 |
| 2,661,293 | 12/1953 | Land | 96—76 |
| 2,923,623 | 2/1960 | Land | 96—29 |
| 2,983,606 | 5/1961 | Rogers | 96—29 |
| 3,173,786 | 3/1965 | Green et al. | 96—29 |
| 2,607,685 | 8/1952 | Land | 96—29 |

FOREIGN PATENTS

| 576,590 | 5/1959 | Canada. |
| 874,046 | 8/1961 | Great Britain. |

J. TRAVIS BROWN, *Acting Primary Examiner.*

NORMAN G. TORCHIN, *Examiner.*

UNITED STATES PATENT OFFICE
CERTIFICATE OF CORRECTION

Patent No. 3,362,819  January 9, 1968

Edwin H. Land

It is certified that error appears in the above identified patent and that said Letters Patent are hereby corrected as shown below:

Column 2, line 49, "eye" should read -- dye --; line 64, after "As is" insert -- now --. Column 3, line 63, ", now U.S. Patent No. 3,239,338 issued March 8, 1966" should read -- (now U.S. Patent No. 3,239,338 issued March 8, 1966) --. Column 5, line 18, "of" should read -- to --; line 19, before "controllable insert -- is --. Column 9, line 26, "at", second occurrence, should read -- of --. Column 10, line 52, "11" should read -- 10 --. Column 11, line 61, after "1966." insert a closing bracket. Column 12, line 34, "an" should read -- and --; line 57, "Example should read -- Examples --. Column 14, line 18, after "eye" insert -- are --. Column 15, line 13, "247,862" should read -- 247,868 --; line 18, "247,868" should read -- 259,436 --; line 19, "3,287,127" should read -- 3,353,956 --. Column 16, line 36, "ues" should read -- use --.

Signed and sealed this 27th day of January 1970.

(SEAL)
Attest:

EDWARD M. FLETCHER, JR.
Attesting Officer

WILLIAM E. SCHUYLER, JR.
Commissioner of Patents